(12) United States Patent
Kurz

(10) Patent No.: US 9,771,502 B2
(45) Date of Patent: Sep. 26, 2017

(54) ADHESIVE FORMULATION AND ALSO METHOD FOR THE TREATMENT OF REINFORCING INSERTS

(75) Inventor: Guenter Kurz, Tamins (CH)

(73) Assignee: EMS-PATENT AG, Domat/Ems (CH)

( * ) Notice: Subject to any disclaimer, the term of this patent is extended or adjusted under 35 U.S.C. 154(b) by 641 days.

(21) Appl. No.: 12/937,696

(22) PCT Filed: Apr. 6, 2009

(86) PCT No.: PCT/EP2009/002534
§ 371 (c)(1),
(2), (4) Date: Dec. 21, 2010

(87) PCT Pub. No.: WO2009/127343
PCT Pub. Date: Oct. 22, 2009

(65) Prior Publication Data
US 2011/0098381 A1 Apr. 28, 2011

(30) Foreign Application Priority Data
Apr. 14, 2008 (EP) .................................. 08 007 332

(51) Int. Cl.
| *B05D 5/10* | (2006.01) |
| *C09D 161/12* | (2006.01) |
| *C09D 163/04* | (2006.01) |
| *C09J 161/12* | (2006.01) |
| *C09J 163/04* | (2006.01) |
| *C08J 5/06* | (2006.01) |
| *B32B 27/26* | (2006.01) |
| *B32B 27/38* | (2006.01) |
| *B32B 27/42* | (2006.01) |
| *C08K 5/29* | (2006.01) |
| *C08L 63/04* | (2006.01) |

(52) U.S. Cl.
CPC ............. *C09J 163/04* (2013.01); *C08J 5/06* (2013.01); *C09J 161/12* (2013.01); *C08J 2321/00* (2013.01); *C08K 5/29* (2013.01); *C08L 63/04* (2013.01)

(58) Field of Classification Search
None
See application file for complete search history.

(56) References Cited

U.S. PATENT DOCUMENTS

| 3,419,450 A | | 12/1968 | Krysiak |
| 5,624,765 A | * | 4/1997 | Toukairin et al. ............ 428/492 |
| 6,790,901 B2 | * | 9/2004 | Kawaguchi ................... 524/494 |
| 2002/0122938 A1 | | 9/2002 | Fisher |
| 2008/0300347 A1 | * | 12/2008 | Kurz et al. ...................... 524/86 |

FOREIGN PATENT DOCUMENTS

| EP | 1221456 A1 | 7/2002 |
| EP | 1270799 A1 | 1/2003 |
| WO | 2007051562 A1 | 5/2007 |

OTHER PUBLICATIONS

World IP Organization. "International Search Report and Written Opinion." PCT/EP2009/002534. Applicant: EMS-PATENT AG, Mailed Aug. 5, 2009.
European Patent Office. "Search Report." EP08007332. Applicant: EMS-PATENT AG, Mailed Aug. 14, 2008.
Office Action for related Russian Patent Application No. 2010141907/05(060144) dated Oct. 3, 2012.
English Translation of Office Action for related Russian Patent Application No. 2010141907/05(060144) dated Oct. 3, 2012.

* cited by examiner

*Primary Examiner* — Michael J Feely
(74) *Attorney, Agent, or Firm* — Millen White Zelano and Branigan, PC; Csaba Henter; Anthony Zelano

(57) ABSTRACT

The present invention relates to an adhesive formulation in the form of an aqueous dispersion with a solids content of 10 to 40% by weight relative to the adhesive formulation, for the treatment of reinforcing inserts for the production of reinforced polymer products, 100% by weight of the solids containing
a) 1 to 20% by weight of a bisphenol A epoxy novolak,
b) 0 to 20% by weight of an entirely or partially blocked isocyanate,
c) 60 to 92% by weight of a resorcinol formaldehyde latex (RFL).

23 Claims, No Drawings

ADHESIVE FORMULATION AND ALSO METHOD FOR THE TREATMENT OF REINFORCING INSERTS

The invention relates to a novel adhesive formulation for the treatment of reinforcing inserts which are provided for the production of reinforced polymer products, the adhesive formulation containing a bisphenol A epoxy novolak.

The reinforcing inserts are used for example in the form of fibres, yarns, cord, woven fabrics or knitted fabrics.

In the production of fibre-reinforced rubber products or products made of fibre-reinforced thermoplastic rubber, it has proved to be favourable if an adhesive is used in order to improve the adhesion between textile reinforcing insert and the rubber. The use of such an adhesive is important in particular in the field of tyre cord and other highly-loaded composite materials with reinforcing fibres. It is known in particular for this application field, from the state of the art, to use resorcinol formaldehyde latex systems (RFL) for bonding synthetic fibres to rubber products.

Either a one-step process or a two-step process can thereby be used. It has been shown in practice that essentially only the two-step process leads to satisfactory results in particular in the case of non-activated polyester fibres. In the case of the two-step process, activation of the fibres is undertaken firstly in a first step in such a manner that these are coated with epoxide and/or with isocyanate. In general, this is achieved with an aqueous dispersion in which the isocyanate and/or the epoxide is contained in the aqueous dispersion with a specific solids content. Subsequent to this first step, the coating with a resorcinol formaldehyde latex system is then undertaken in a second step. It is ensured by means of this two-step process that complete activation of the fibres is effected in the first step in such a manner that the coating with epoxide and/or with isocyanate leads to the formation of active functional groups on the surface of the fibre so that the treatment with the latex can then be effected with the second step. The treatment with RFL is likewise effected with an aqueous dispersion.

The two-step process is however complex from a processing technology point of view and also the preparation of two separate dispersions and the handling thereof is difficult.

There has therefore been no lack of attempts to implement the treatment in the form of a one-step process. One-step systems are described for example in US 2002/0122938 and also in U.S. Pat. No. 3,419,450.

The one-step systems, i.e. the application of an aqueous dispersion with RFL and also epoxide and isocyanate, still could not in practice be accomplished. There should be mentioned as disadvantages in the case of one-step systems of this type, as described for example also in the US patent 2002/0122938, that the dispersion becomes non-homogeneous after a few hours, for example due to sedimentation or flocculation, which also leads to a change in the composition. Consequently, the result is reducing coefficients of adhesion, spotted reinforcing inserts, blockage of the vacuum suction lips or formation of a coating on the conveyor rollers of the reinforcing insert so that these one-step systems have only an inadequate pot life. There is termed by pot life the timespan in which the adhesive formulation remains homogeneous and good adhesion is achieved and hence can be used without difficulty and with improved productivity.

According to the batch size of the coating unit, pot lives of at least 6 to 12 hours are demanded by the user.

Starting herefrom, it is therefore the object of the present invention to propose an adhesive formulation which can be applied in the form of a one-step system, the adhesive formulation being intended to have a pot life which is at least 6 hours. The adhesive formulation is intended in addition to have good wetting and good adhesion on the reinforcing inserts, preferably on polyester reinforcing inserts, in particular on PET reinforcing inserts, the reinforcing inserts being able to be activated or non-activated. A further object of the present invention is to indicate a method for the treatment of reinforcing inserts, in particular tyre cord, conveyor cord or V-belt cord for the production of reinforced polymer products. The reinforced polymer products have good adhesion between reinforcing insert and matrix, e.g. rubber or thermoplastic rubber or thermoplastic elastomers.

This object is achieved with respect to the adhesion formulation by the features of patent claim 1 and, with respect to the method, by the features of patent claim 11.

According to the invention, an adhesive dispersion is hence proposed for a one-step system for the treatment of reinforcing inserts for producing reinforced polymer products, in which, in addition to the isocyanate and the resorcinol formaldehyde latex (RFL) as epoxide, a selected epoxide, namely bisphenol A epoxy novolak in the form of a solid, is contained in the formulation.

The applicant was able to show that it is possible with a formulation selected specifically in this way to extend the pot life to at least 6 hours, preferably to at least 24 hours, particularly preferred at least 48 hours, very particularly preferred to at least 70 hours, in particular to at least 100 hours. Surprisingly, it was established that good adhesion values are achieved even with a pot life extended in this manner.

Further advantages of the adhesion formulations according to the invention are their freedom from sedimentation and flocculation, uniform coating thickness, spot-free reinforcing insert and no coating formation on the conveyor rollers of the reinforcing inserts. With the adhesive formulations according to the invention, a "retarded cord penetration (RCP)" is achieved in addition, i.e. delayed penetration of the adhesive formulation into the reinforcing insert, which leads to reduced loss of the adhesive formulation and a more flexible reinforcing insert.

The adhesive formulation according to the invention is suitable for applying a quantity of coating of 2-8% by weight, relative to the reinforcing insert. In fact it is possible to apply this quantity in a single coating step. Below 2% by weight, the coating is so thin that a gap-free coating is no longer ensured. In contrast, above 8% by weight, the result is variations in the uniformity thereof because of the high thickness of the coating.

Cord is coated preferably, particularly preferred polyester cord, very particularly preferred PET cord, the cord being able to be activated or non-activated.

An essential element of the present invention is hence the selection of the specific epoxide in the form of bisphenol A epoxy novolak in the indicated weight quantity. Novolaks are polycondensation products, produced from formaldehyde and phenols by catalysis of acid, i.e. in the present case here from formaldehyde and bisphenol A. The introduction of the epoxy group is achieved by reaction with epichlorohydrin.

There are preferably used bisphenol A epoxy novolaks which have an epoxide equivalent of 190 to 240 g/eq, particularly preferred of 195 to 230 g/eq, an epoxide functionality of 3 to 10, particularly preferred of 8 and a softening point of 70 to 90° C., particularly preferred of 80° C.

The epoxide equivalent is determined according to DIN EN ISO 3001. The measurement of the softening point is effected on the Kofler bench or by determining the Vicat softening temperature according to DIN 53 462.

In addition to the selection of bisphenol A epoxy novolak, it is essential for the present invention that the latter is used in a quantity of 1 to 20% by weight relative to 100% by weight of solids. Surprisingly, the applicant was thereby able also to show that very good results, i.e. pot lives of at least 6 hours, are also achieved when bisphenol. A epoxy novolak is used in a quantity of 4 to 19% by weight, particularly preferred in a quantity of 12.5 to 18% by weight, relative to 100% by weight of solids. The isocyanate which is likewise present as a solid in the dispersion is used in a quantity of 0 to 20% by weight, preferably 4 to 19% by weight, particularly preferred 12.5-18% by weight, relative to 100% by weight of solids. The resorcinol formaldehyde latex is used such that it contributes to the solids in a quantity of 60 to 92% by weight, preferably 62-92, particularly preferred 64-75% by weight, relative to 100% by weight of solids.

In a preferred embodiment of the adhesive formulation according to the invention, the weight ratio of component a) bisphenol A epoxy novolak to component b) isocyanate is in the range of 60 to 40 to 40 to 60. This weight ratio is particularly preferably 50 to 50.

The adhesive formulation according to the invention has a solids content of 10 to 40% by weight, preferably of 10 to 30% by weight, particularly preferred 15 to 30% by weight, very particularly preferred 18 to 27% by weight. The average particle size of the particles present in the dispersion is <5 μm.

In addition, it has proved to be advantageous in the adhesive formulation if, as isocyanates, 4-4-diisocyanate diphenylmethane (MDI) and/or toluene diisocyanate (TDI) and/or naphthyl isocyanate (NDI) are used. The invention however encompasses of course all other known isocyanates which can be used for adhesive formulations of this type. Reference is made in this respect for example to US 2002/0122938 A1 and the diisocyanates described there.

In the case of the isocyanates, in particular lactam-blocked isocyanates have proved in the present invention to be a favourable blocking agent. Examples of these are ε-caprolactam, d-valerolactam. However the invention encompasses of course also other known blocking agents. These are: oximes, e.g. methyl ethyl ketoxime (butanone oxime), methyl amyl ketoxime and cyclohexanone oxime. Monophenols, e.g. phenol, resorcinol, cresol, trimethyl phenols, tert, butyl phenols, Primary, secondary and tertiary alcohols, glycol ethers, readily enol-forming compounds, such as e.g. acetoacetic ester, acetylacetone, malonic acid derivatives, secondary aromatic amines. Imides, mercaptans, triazoles.

A further increase in reaction speed in the case of the adhesive formulation according to the invention can also be achieved in that a catalyst is added in the form of a metal compound. There are thereby suitable as catalyst metal compounds of the metals sodium, potassium, caesium, strontium, silver, cadmium, barium, cerium, uranium, titanium, chromium, tin, antimony, manganese, iron, cobalt, nickel, copper, zinc, lead, calcium and/or zirconium. In the case of the metal compounds, those of zinc are preferred. Suitable compounds hereby are zinc acetate, zinc sulphate, zinc carbonate, zinc oxide, zinc acetylacetonate and/or zinc chloride. Zinc acetate is very particularly preferred.

The catalyst is present in the dispersion in dissolved form, the concentration being 0.0001 to 0.1 mol/kg of the formulation.

The resorcinol formaldehyde latex system (RFL) used according to the present invention is known per se from the state of the art.

Furthermore, the invention relates to a method for the treatment of reinforcing inserts for producing reinforced polymer products (patent claim 12). In the case of the method according to the invention, an adhesive formulation as described above is used. The adhesive formulation can be produced thereby shortly before the provided application by mixing the individual components. The components a) bisphenol A epoxy novolak and b) isocyanate can however also be mixed already in advance a long time before the application.

However it is essential in the present invention that the adhesive formulation is applied in the form of a one-step system, i.e. all the components must be present in a single aqueous dispersion before the coating of the reinforcing inserts.

The applicant was able to show in addition that the adhesive formulation according to the invention is particularly suitable for the coating of reinforcing inserts made of non-activated polyester cord, in particular non-activated PET cord. Pot lives of at least 6 hours could hereby be achieved and, at the same time, outstanding reaction speeds which are significantly above those known to date from comparable systems.

The invention is explained subsequently in more detail with reference to an example and a comparative example.

The following materials are thereby used:

Cresol Epoxy Novolak:
  ECN-1400 by the company Ciba
  Bisphenol A epoxy novolak with an epoxide equivalent of 210 g/eq, a functionality of 8 and a softening point of 80° C.

Blocked Isocyanate:
  Grilbond 1L-6 by the company EMS-PRIMID

RFL:
  Deionised water 434 parts
  Styrene butadiene vinyl pyridine latex (solids proportion 41% by weight) 483 parts,
  Resorcinol 22 parts,
  Formaldehyde (37% by weight) 32 parts,
  Sodium hydroxide 0.6 parts,
  Ammonium hydroxide (25% by weight) 25 parts.

Deionised water is placed in a first vessel and subsequently, with agitation, sodium hydroxide, resorcinol and formaldehyde are added. This mixture is agitated for 6 hours at 25° C.

The styrene butadiene vinyl pyridine latex is placed in a second vessel, mixed with the ammonium hydroxide and added to the mixture from the first vessel. During the entire time and for a further 17 hours agitation takes place. The result is an RFL with approx. 23% by weight of solids.

1) Comparative Example

A dispersion with the following composition of the solids proportion was produced:
  14.5% by weight ECN-1400
  14.5% by weight Grilbond IL-6
  71% by weight RFL For this purpose, 121 parts deionised water were placed in a vessel and in succession 805 parts RFL and 37 parts ECN-1400 and 37 parts IL -6 were added with agitation and subsequently agitated for a further 15 minutes at 25° C.

2) Example According To The Invention

A dispersion with the following composition of the solids proportion was produced:
  14.5% by weight bisphenol A epoxy novolak
  14.5% by weight Grilbond 1L-6
  71% by weight RFL.

For this purpose, 121 parts deionised water were placed in a vessel and in succession 805 parts RFL and 37 parts bisphenol A epoxy novolak and 37 parts IL -6 were added with agitation and subsequently agitated for a further 15 minutes at 25° C.

The non-activated cord Performance Fibers HMLS polyester, 1,100×1×2 dtex, ZS 470, 1×50 were coated with the formulations 1) and 2) in a one-step process on a laboratory dip unit. The adhesion results are reproduced in Data Set 1 (comparative example) and 2 (example according to the invention).

As the test results show, the one-step dip, according to the comparative example, i.e. with a cresol epoxy novolak, now has significantly poorer pot lives, which is shown in a severe drop in adhesion after 5 hours dip duration (Data Set 1). In addition, a base coating in the coating bath is shown already after 5 hours.

The relative peel value indicated in Data Set 1 was thereby measured according to ASTM D 4393 with Continental B458 as test rubber.

However it was shown that a one-step dip according to the invention with a bisphenol A epoxy novolak itself has, after a pot life of 70 hours and even after 100 hours, excellent adhesion. Reference is made in this respect to Data Set 2 which shows again the relative peel values, as also in Data Set 1, measured according to ASTM D 4393 with Continental 13458 as test rubber. Neither after 70 hours nor after 101 hours can any base coating in the coating bath be established:

Data Set 1

| Usage duration of the adhesive formulation | Relative peel value [%] |
|---|---|
| 1 | 96 |
| 2 | 94 |
| 3 | 96 |
| 4 | 96 |
| 5 | 100 |
| 6 | 85 |
| 8 | 70 |

Data Set 2

| Usage duration of the adhesive formulation | Relative peel value [%] |
|---|---|
| 1 | 96 |
| 6 | 94 |
| 24 | 91 |
| 48 | 9396 |
| 72 | 100 |
| 80 | 100 |
| 101 | 99 |

The invention claimed is:

1. An adhesive formulation in the form of an aqueous dispersion with a solids content of 10 to 40% by weight relative to the adhesive formulation, which is suitable for the treatment of reinforcing inserts for the production of reinforced polymer products,
wherein 100% by weight of the solids containing
a) 14.5 to 20% by the weight of a bisphenol A epoxy novolak,
b) 14.5 to 20% by the weight of an entirely of partially blocked isocyanate, and
c) 60 to 71% by weight of a resorcinol formaldehyde latex.

2. An adhesive formulation according to claim 1, wherein the solids content is 10 to 30% by weight.

3. An adhesive formulation according to claim 1, wherein the solids content is 15 to 30% by weight.

4. An adhesive formulation according to claim 1, wherein the solids content is 18 to 27% by weight.

5. An adhesive formulation according to claim 1, wherein the solids proportion a) of bisphenol A epoxy novolak is 15 to 19% by weight.

6. An adhesive formulation according to claim 3, wherein the solids proportion a) of bisphenol A epoxy novolak is 18 to 19% by weight.

7. An adhesive formulation according to claim 1, wherein the solids proportion b) of the blocked or partially blocked isocyanate is 15 to 19% by weight.

8. An adhesive formulation according to claim 1, wherein the isocyanate is blocked with lactam.

9. An adhesive formulation according to claim 1, wherein the isocyanate is 4,4-diisocyanate diphenylmethane and/or toluene diisocyanate and/or naphthyl diisocyanate.

10. An adhesive formulation according to claim 1, wherein the solids proportion c) of the RFL is 62-64% by weight.

11. An adhesive formulation according to claim 1, wherein the formulation contains 0.0001 to 0.1 mol/kg of a metal compound as catalyst selected from the group consisting of zinc, strontium, cadmium, sodium, caesium, potassium, silver, barium, titanium, chromium, tin, antimony, manganese, iron, cobalt, nickel, cerium, uranium, copper, calcium, zinc, lead and zirconium.

12. An adhesive formulation according to claim 1, further comprising one or more additive- and/or dispersion agents.

13. An adhesive formulation according to claim 1, which has a pot life of at least 6 hours.

14. An adhesive formulation according to claim 1, which has a pot life of at least 24 hours.

15. An adhesive formulation according to claim 1, which has a pot life of at least 48 hours.

16. An adhesive formulation according to claim 1, which has a pot life of at least 70 hours.

17. An adhesive formulation according to claim 1, which has a pot life of at least 100 hours.

18. A method for treating a reinforcing insert suitable for the production of a reinforced polymer product, comprising applying to said reinforcing insert an adhesive formulation according to claim 1.

19. A method according to claim 18, wherein the adhesive formulation is produced directly before the treatment by mixing the individual components.

20. A method according to claim 18, wherein the adhesive formulation is produced immediately before application by mixing component c) into the formulation already present as a mixture of components a) and b).

21. A method according to claim 18, wherein a non-activated reinforcing insert is treated.

22. A method according to claim 18, wherein the reinforcing insert is a tyre cord, conveyor cord or V-belt cord.

23. A method according to claim 18, wherein a non-activated reinforcing insert made of polyester is treated.

* * * * *